United States Patent [19]

Gmeiner et al.

[11] 4,122,436

[45] Oct. 24, 1978

[54] INSTALLATION FOR THE PROTECTION OF A LINE

[75] Inventors: Günter Gmeiner, Sindelfingen; Hermann Möller, Aidlingen, both of Germany

[73] Assignee: Daimler-Benz Aktiengesellschaft, Germany

[21] Appl. No.: 749,422

[22] Filed: Dec. 10, 1976

[30] Foreign Application Priority Data

Dec. 10, 1975 [DE] Fed. Rep. of Germany ....... 2555421

[51] Int. Cl.² .............................................. G08B 21/00
[52] U.S. Cl. ..................................... 340/605; 340/626
[58] Field of Search .................................. 340/242, 240

[56] References Cited

U.S. PATENT DOCUMENTS

| 2,151,092 | 3/1939 | Dunsheath | 340/242 |
| 2,767,392 | 10/1956 | Szwargulski | 340/242 |
| 3,086,069 | 4/1963 | Kolmorgen | 340/242 X |
| 3,184,958 | 5/1965 | Eaton | 340/242 X |
| 3,299,417 | 1/1967 | Sibthorpe | 340/242 |

Primary Examiner—Donald J. Yusko
Assistant Examiner—Daniel Myer
Attorney, Agent, or Firm—Craig & Antonelli

[57] ABSTRACT

An installation for the protection of a line, according to which the line is surrounded at least within its area endangered by external influences by a coaxially arranged tubular member and the annular space disposed between the line and the tubular member is filled by a control medium which triggers a warning indication in case of an unusual pressure change caused, for example, by mechanical damage to the outer tubular member.

9 Claims, 1 Drawing Figure

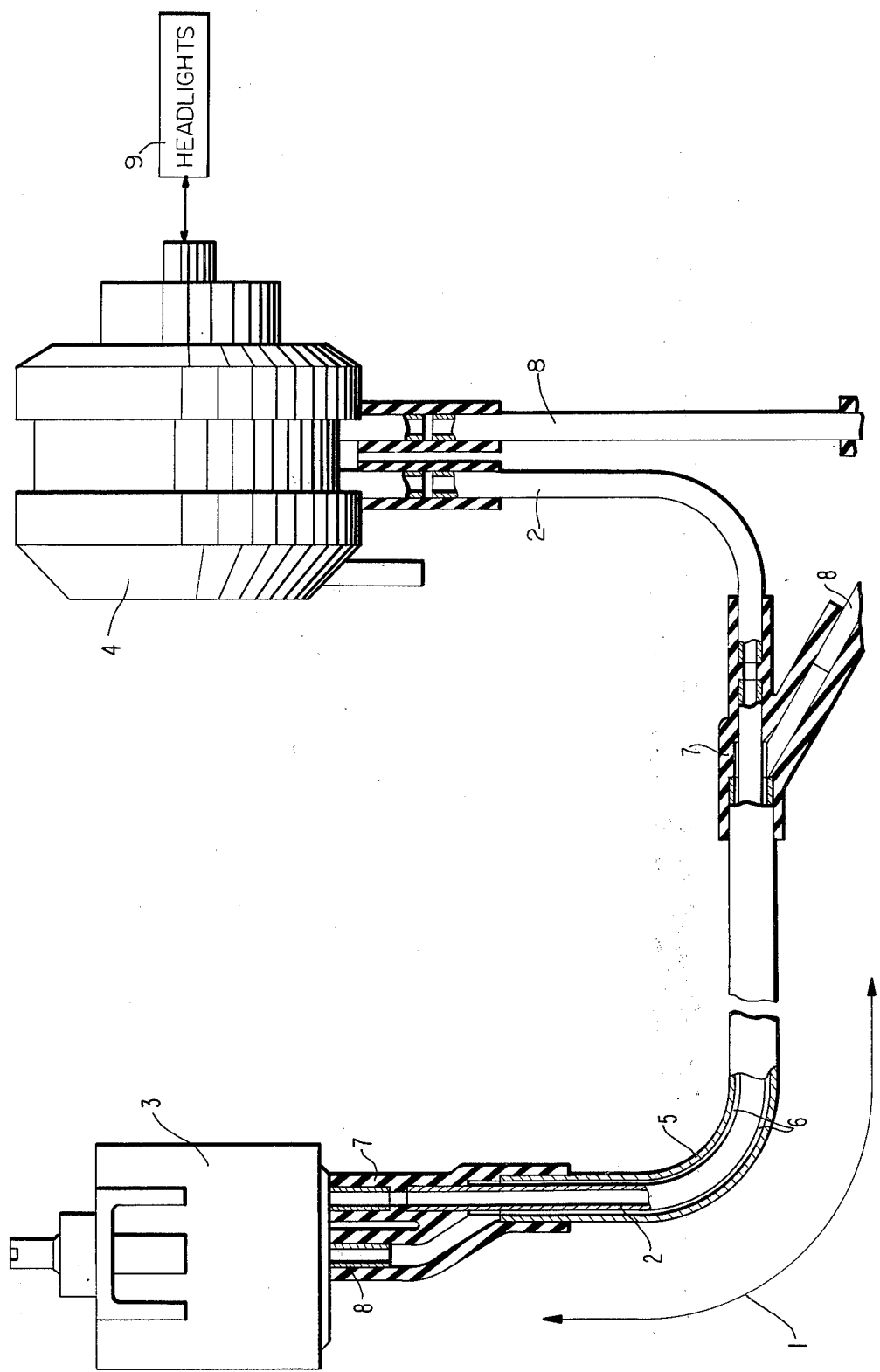

INSTALLATION FOR THE PROTECTION OF A LINE

The present invention relates to an installation for the protection of a line. Frequently, lines extend within areas in which the danger exists due to external influences, for example, due to impact, that the wall is damaged and the working medium disposed, for example, on the inside of the line escapes or leaks out. In order to counteract such a danger and to preclude possible operating breakdowns, it is known to provide endangered line sections with a protective cover or casing. Such a cover or casing surrounds the pipe or line to be protected tightly so that after the destruction of the casing or cover, the pipe is immediately attacked. Such a protective installation provides therefore no assurance to timely indicate commencing line defects.

It is therefore the task of the present invention to provide an installation for the protection of a line by means of which commencing wall defects are indicated timely, even if the corresponding line section is located at a place which is not freely accessible. Consequently, an installation for the protection of a line is proposed whereby according to the present invention the line is surrounded in its area endangered by the external influences by a coaxially arranged tubular member and the annular space disposed between the line and the tubular member is filled out with a control medium under a pressure which triggers a warning indication in case of an unusual change in pressure caused, for example, by a mechanical damage of the tubular member.

In one preferred embodiment of the present invention, a lead-out line leads away on both sides from the annular space, whereby the control medium passes over into this line and is conducted to actuating and/or control elements by way of this line.

A simple assembly is achieved with vacuum prevailing in the line if a distributor member which is adapted to be slipped over the lines and which is made of an elastic material is interconnected between the annular space and the lead-out line.

Accordingly, it is an object of the present invention to provide an installation for the protection of a line which avoids by simple means the aforementioned shortcomings and drawbacks encountered in the prior art.

Another object of the present invention resides in an installation for the protection of a line which indicates incipient wall defects in good time to avoid operating breakdowns or failures due to leakage in the line.

A further object of the present invention resides in a protective installation for a line which is simple in construction, reliable in operation, and easy to install and assemble.

These and other objects, features and advantages of the present invention will become more apparent from the following description when taken in connection with the accompanying drawing which shows, for purposes of illustration only, one embodiment in accordance with the present invention, and wherein:

The single FIGURE is a somewhat schematic view of an installation for the protection of a line in accordance with the present invention.

Referring now to the single FIGURE of the drawing, a line 2 is shown extending within an area 1 of a motor vehicle (not shown) endangered by stone-throw which is a part of an adjusting installation 3 and 4 for the headlight adjustment, actuated by vacuum. U.S. Pat. No. 3,784,810, which is incorporated herein by reference, discloses such a vacuum operated headlight adjustment. The annular space 6 between the line 2 and a tubular member 5 accommodates a control medium—in the instant case—vacuum—whereby the control medium passes over into a line 8 by way of distributor members 7 of elastic material which are mounted over the line 2 and over the tubular member 5 as shown. This control medium determines the position of headlights 9 in the manner set forth in U.S. Pat. No. 3,784,810.

If a damage of the tubular member 5 occurs so that atmospheric air is sucked-in, then the pressure value of the control medium in the annular space 6 changes and the headlights 9 are adjusted into a lower position illustrating the defect.

The present invention is not limited to the illustrated embodiment but can be used for any type of line, whereby also acoustic and/or other optical installations can be used as warning indicators which, for example, may also be operatively connected directly with a fully enclosed annular space.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. An installation for the protection of a line of an adjusting means, characterized in that the line is surrounded at least within its area endangered by external influences by a tubular member located substantially coaxially thereto, said line and said tubular member forming therebetween an annular space containing a control medium under a predetermined pressure with a lead-out line leading away from said annular space at least at one point, so that the control medium passes from the line into said lead-out line and is conducted to the adjusting means by way of said lead-out line and in that a predetermined control of the adjusting means is triggered in case of damage of the outer tubular member causing an unusual pressure change on the part of the control medium within said annular space as a warning indication.

2. An installation according to claim 1, characterized in that one lead-out line each leads away from said annular space at two different points thereof into which lead-out lines the control medium passes from said annular space and through which the control medium is conducted to the adjusting means.

3. An installation according to claim 2, characterized in that the distributor member is mounted over the line and the tubular member to interconnect the annular space and each lead-out line.

4. An installation according to claim 1, characterized in that a lead-out line leads away from said annular space at least from one point, and in that the control medium passes from the line into said lead-out line and is conducted to the adjusting means by way of said lead-out line.

5. An installation according to claim 4, characterized in that one lead-out line each leads away from said annular space at two different points thereof into which lead-out lines the control medium passes from said annular space and through which the control medium is conducted to the adjusting means.

6. An installation according to claim 4, characterized in that the distributor member is mounted over the line and the tubular member to interconnect the annular space and each lead-out line.

7. An installation according to claim 1, characterized in that the line of the adjusting means is connected between two parts of the adjusting means with the annular space formed between the tubular member and line extending only along a portion of the line, and in that a lead-out line leads away from the annular space at two different points of the annular space, the control medium being conducted to the parts of the adjusting means through the lead-out lines and the annular space.

8. An installation according to claim 7, characterized in that the adjusting means is an adjusting installation for headlights of a vehicle and the control medium is a vacuum.

9. An installation according to claim 8, characterized in that a distributor member of an elastic material is mounted over the line and the tubular member to interconnect the annular space and each lead-out line.

* * * * *